Nov. 5, 1968    J. E. LEAHY ET AL    3,408,734
METHOD OF MANUFACTURING A DYNAMOELECTRIC MACHINE
Filed Jan. 21, 1965

INVENTORS:
JAMES F. LEAHY
MICHAEL J. LACY
BY
ATTORNEY.

United States Patent Office 3,408,734
Patented Nov. 5, 1968

3,408,734
METHOD OF MANUFACTURING A DYNAMO-ELECTRIC MACHINE
James E. Leahy, St. Louis County, and Michael J. Lacy, Florissant, Mo., assignors to Emerson Electric Co., St. Louis County, Mo., a corporation of Missouri
Filed Jan. 21, 1965, Ser. No. 426,776
2 Claims. (Cl. 29—596)

ABSTRACT OF THE DISCLOSURE

The process of making a dynamoelectric machine in which a flat end face of a wound laminated core is mounted on and in compressive face to face relation to a member, which includes the steps of impregnating a wound laminated core with an adhesive solution, clamping the wound core with a compressive force of a magnitude with the compressive force with which the core is mounted on the member and in the clamping pattern in which the core is mounted on the member, and, thereafter, while the core is so clamped, curing the adhesive. The resulting core has a hardened bonding material disposed between and engaging next adjacent laminations, securing the laminations together, the laminations being collectively compressively prestressed so that the subsequent compressive forces of core mounting means, exerting a compressive force on the laminations, have little or no tendency to cause the laminations to shift radially relative to one another. The clamping force may then be released, but is restored when the core is mounted to the member.

---

This invention relates to dynamoelectric machines having a wound laminated core and to a method of making such a wound core. It has particular application to wound cores which are compressively mounted to a surface or surfaces abutting a radial end face of the core, the compressive forces of mounting means acting substantially perpendicularly to that end surface. The invention will be described as applied to the stator of a hermetic compressor motor wherein the stator is bolted to a casting having circumferentially spaced flats into which stator mounting bolts, passing through the stator, extend, and upon which a radial end face of the stator is seated. However, the invention is also applicable to other machines in which a wound core is mounted in end face to bearing face relationship, such, for example, as in a motor in which one or both end shields are mounted with radial flats on the end shield abutting the radial end face of a wound stator.

In a hermetic compressor application, a rotor is commonly fixed in position, a stator is centered with respect to the rotor by means of an air gap defining gauge, and the stator is thereupon bolted into position on a base or bracket which is fixed with respect to the rotor and stator. It can be seen that, thereafter, any appreciable shifting or cocking of the stator relative to the rotor will be intolerable.

In stators made up of laminations which are stacked and secured together in the usual ways, by welding in notches across their collective peripheral surfaces, by rivets extending through axially directed passages through their yoke sections, by cleats across their collective peripheral surfaces or the like compressive means, successive laminations are not in intimate contact through all of their contiguous surfaces. Accordingly, in use, when the stator is bolted to a base by means of bolts extending through passages in the yoke sections of the stator core, the laminations permit and may even encourage the mounting bolts to work loose, permitting shifting or cocking of the stator with respect to the rotor in the stator bore.

One method of obtaining a "solid" core structure is to cement the laminations to one another by means of an epoxy or some other adhesive, thus filling the minute spaces between the laminations and preventing their relative movement. However, particularly in the case of hermetic motors, the stator is commonly subjected to relatively high heat after it has been mounted on the base, in the course of a desiccating process, and the adhesive tends to soften, permitting the laminations to move and reducing the draw-down pressure of the bolts. This may produce cocking at once, or it may lead to loosening of the bolts when the motor is in use.

One of the objects of this invention is to provide a stator which remains dimensionally stable with respect to a rotor in its bore in an application in which the stator is compressively mounted to a surface abutting a radial end face of the stator.

Another object is to provide a method of producing such a stator.

Another object is to provide such a process which requires few steps and a short time to perform.

Other objcets will become apparent to those skilled in the art in the light of the following description and accompanying drawing.

Summary of the invention

In accordance with this invention, generally stated, a wound laminated core is provided the laminations of which are adhered to one another in such a way that, when the wound core is mounted compressively to a surface abutting a radial end face of the core, the internal forces tending to act axially of the core act as if they were substantially in equilibrium, and the core remains dimensionally stable. The process of making this core includes stacking laminations to define a bore; winding the core; impregnating, as by dipping, the wound core with an adhesive solution; clamping the wound core in a manner simulating the ultimate mounting condition of the core; while the core is so clamped, curing the adhesive; in the preferred embodiment described, releasing the clamps, and compressively mounting the core with a draw-down pressure of a magnitude with the clamping pressure exerted on the core during the curing of the adhesive.

In the preferred embodiment shown and described, holding of the laminations for the winding and impregnating steps is accomplished by the conventional welding of the laminations, though other conventional expedients can be used, such as cleating, riveting and the like.

While it is not the preferred form, the holding step can be combined, in effect, with the clamping step, i.e., the clamping can serve to hold the laminations during the winding and impregnating steps, as well as during the curing step.

One of the advantages of impregnating and curing after winding, is that only a single impregnating and curing step is required. This not only simplifies the procedure, but importantly, does not pose the danger inherent in a process in which the core is impregnated and cured before winding and then, after winding, the windings are coated and cured, that there will be softening of the adhesive or distortion of the core in the course of the second curing step.

The core so produced acts as if it were internally prestressed after the clamping pressure is released which prestressing is relieved when the compressive force of the mounting means is applied, so that, in mounted condition, the core is dimensionally stable.

Description of the preferred embodiments

Figure 1:
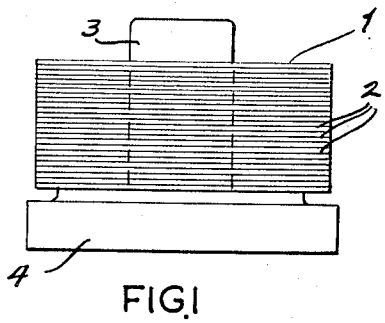
FIGURES 1–7 are a diagrammatic representation of seven steps in one illustrative embodiment of process of this invention, FIGURE 7 also illustrating a stator of this invention mounted on a base.
Figure 2:
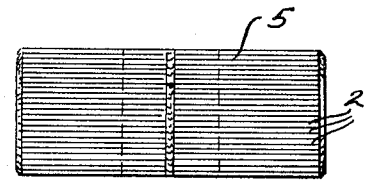
Figure 3:
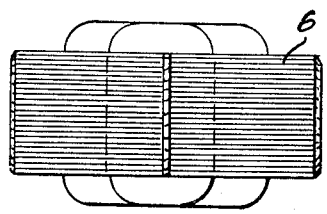
Figure 4:
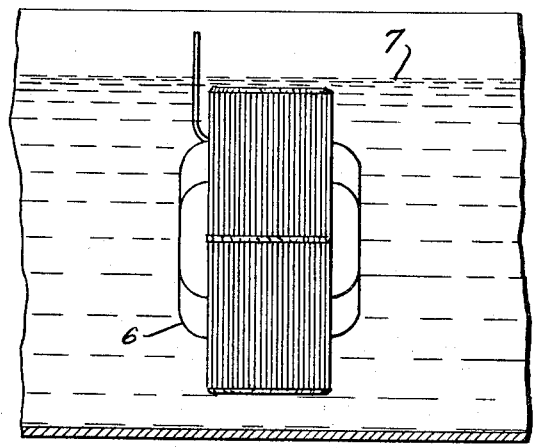
Figure 5:
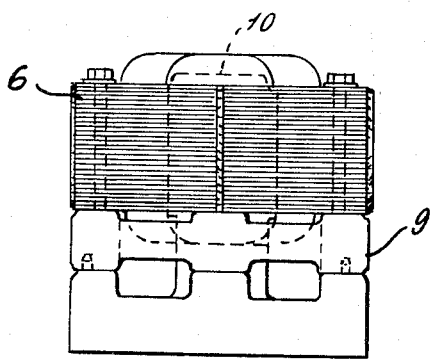
Figure 6:
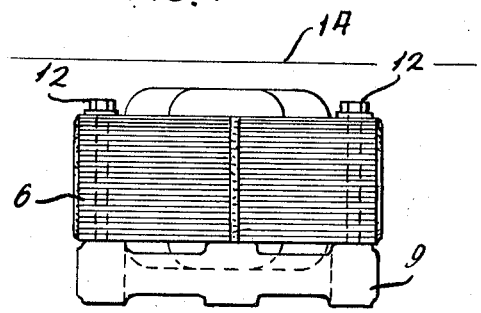
Figure 7:
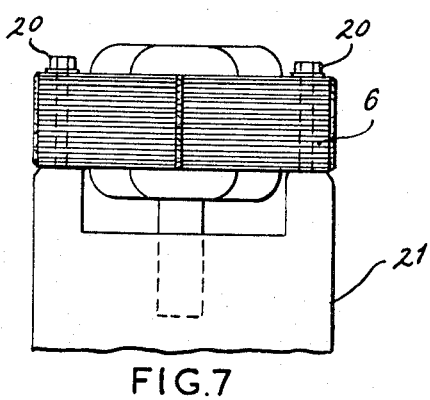

Referring now to the drawing for one illustrative example of process of this invention and a wound core resulting from that process, the first step is the stacking of laminations, and reference numeral 1 indicates a stack of laminations 2 on a mandrel 3, which is part of a welding fixture 4. This is conventional, as is the welding, illustrated by the welded stator core 5. The stacked laminations are conventionally flattened and held under pressure immediately prior to and during the welding (or cleating or riveting) process, and this embodiment of process is conventional in that respect also.

The stator is then wound, as represented by a wound stator 6. The wound stator is then dipped in an adhesive solution 7, which in this illustrative embodiment, is a conventional epoxy varnish (approximately ten percent epoxy resin, ninety percent solvent) commonly used to coat end wires in the course of production of conventional motors.

The dipped stator is permitted to drain and "dry" to the extent that it can be handled, and is then put on another mandrel 10, around which a clamping plate 9 has already been placed and located.

The mandrel 10 is perpendicular to the plane of flat bearing surfaces on the base of the fixture of which mandrel 10 is a part. Top and bottom flat surfaces of the clamping plate 9 are machined to very accurate parallelism. The wound, dipped stator is forced down the mandrel 10 into solid engagement with the plate 9, and the plate 9 into solid engagement with the base bearing surfaces by an axial force, so that the end face of the stator in engagement with the plate 9 is flat and accurately perpendicular to the stator bore.

In the stator shown, which represents in form a standard hermetic motor stator, there are four through-bolt holes not here shown, through which, when the machine is finally assembled, bolts 20 extend to mount the stator on a base 21. After the dipped but uncured stator is mounted on the mandrel 10, clamping bolts 12 are run through the through-bolt holes in the stator, and screwed into tapped holes in the clamping plate 9. In this embodiment, the clamping plate 9 has exactly the same bearing surface configuration as that of the base 21, and the clamping bolts 12, the same configuration as the through-bolts 20. The clamping bolts 12 are drawn down to the same or a slightly greater degree than the through-bolts 20 are to be drawn down.

The stator is then removed from the mandrel 10, and cured, at an elevated temperature sufficient to cure the epoxy resin, with the mounting bolts 12 and the clamping plate 9 in place, in a curing oven 14. The stator is cooled, the clamping bolts 12 and clamping plate 9 removed, and the stator is mounted, by means of the through-bolts 20, on the base 21 of a compressor.

It has been found that the draw-down pressure of the bolts 20 decreases only negligibly when the mounted stator is subjected to a stringent desiccating process, and maintains its dimensional stability excellently in use.

In another embodiment of process of this invention, the clamping plate 9 and clamping bolts 12 are employed as the holding means, while the core is wound and the stator dipped. In such a process, the stacked laminations will normally be flattened, to minimize the effect of burrs and the like, before the clamping plate is mounted. It is also desirable to use some parting means, such as a polyfluoroethylene (Teflon) or silicone coating to prevent adherence of the clamping bolts and clamping plate to the stator.

If the process is applied to a motor in which one or both end shields are mounted with a radial surface or surfaces on the end shield abutting the radial end face of the wound stator, at least one of the end shields may even be mounted prior to the curing process, either before or after the dipping (impregnating) step, to serve as a part of the clamping means.

Numerous variations in the process of this invention, within the scope of the appended claims, will occur to those skilled in the art in the light of the foregoing disclosure. Merely by way of illustration of such variations, a cold-setting adhesive may be used, provided the clamping pressure is applied before the adhesive sets or is cured.

Having thus described the invention, what is claimed and desired to be secured by Letters Patent is:

1. The process of making a stator intended to be mounted on a base by means exerting an axially compressive force, comprising stacking laminations to define a core having winding slots and a bore; holding said core against misalignment of said laminations; while holding said core, winding said core; while continuing to hold said core, dipping said wound core into an adhesive solution, whereby said solution covers the entire faces of the laminations; thereafter clamping said wound core with a compressive force of a magnitude with the compressive force to be exerted by said base mounting means; while maintaining said clamping force, curing said adhesive, and then releasing said clamping force.

2. The process of making a dynamoelectric machine in which a flat end face of a wound laminated core is mounted in a compressive face to face relation to a member, said process comprising impregnating a wound laminated core with an adhesive solution, whereby said solution covers the entire faces of the laminations; clamping said wound core with a compressive force of a magnitude approximately equal to the compressive force with which said core is mounted in said machine, and in the clamping pattern in which said core is mounted in said machine; and while said wound core is so clamped, curing said adhesive.

References Cited

UNITED STATES PATENTS

| | | | |
|---|---|---|---|
| 3,299,304 | 1/1967 | Hull | 310—217 |
| 2,304,607 | 12/1942 | Sleeter | 29—596 |
| 2,367,428 | 1/1945 | Prat Divi | 29—598 X |
| 2,917,643 | 12/1959 | Mihanowich | 29—596 X |
| 3,195,222 | 7/1965 | Rutledge | 29—596 |
| 3,200,275 | 8/1965 | Lindgren | 29—596 |

JOHN F. CAMPBELL, *Primary Examiner.*

C. E. HALL, *Assistant Examiner.*